(12) United States Patent
Mittal et al.

(10) Patent No.: US 10,812,937 B2
(45) Date of Patent: Oct. 20, 2020

(54) METHOD AND APPARATUS FOR OBTAINING CONTEXTUALLY RELEVANT CONTENT

(75) Inventors: Vineet Mittal, San Diego, CA (US);
Michal J. Koenig, Encinitas, CA (US);
Rajeev D. Rajan, San Diego, CA (US);
Kevin T. Gregory, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 841 days.

(21) Appl. No.: 12/607,231

(22) Filed: Oct. 28, 2009

(65) Prior Publication Data
US 2010/0153488 A1 Jun. 17, 2010

Related U.S. Application Data

(60) Provisional application No. 61/121,861, filed on Dec. 11, 2008.

(51) Int. Cl.
*H04W 4/029* (2018.01)
*G06Q 30/02* (2012.01)

(52) U.S. Cl.
CPC ............ *H04W 4/029* (2018.02); *G06Q 30/02* (2013.01)

(58) Field of Classification Search
CPC ........ H04M 15/06; H04M 1/575; H04M 1/57; H04M 3/42042; H04M 3/42059; G06Q 30/02; H04W 4/029
USPC ........................................................ 709/203
See application file for complete search history.

(56) References Cited

U.S. PATENT DOCUMENTS

| | | | |
|---|---|---|---|
| 2005/0021866 A1 | 1/2005 | Kang et al. | |
| 2006/0002607 A1 | 1/2006 | Boncyk et al. | |
| 2006/0155706 A1* | 7/2006 | Kalinichenko et al. | ........ 707/10 |
| 2007/0016570 A1 | 1/2007 | Punaganti Venkata et al. | |
| 2007/0116224 A1 | 5/2007 | Burke et al. | |
| 2007/0177606 A1 | 8/2007 | Jabri et al. | |
| 2007/0293207 A1 | 12/2007 | Guedalia et al. | |

(Continued)

FOREIGN PATENT DOCUMENTS

| | | |
|---|---|---|
| CN | 1697534 A | 11/2005 |
| CN | 101288077 A | 10/2008 |

(Continued)

OTHER PUBLICATIONS

International Search Report—PCT/US2009/067773—International Search Authority—European Patent Office, Apr. 8, 2010.

(Continued)

*Primary Examiner* — June Y Sison
(74) *Attorney, Agent, or Firm* — Dalei Dong; Arent Fox LLP

(57) ABSTRACT

A method of obtaining contextually relevant content by a wireless communications device is provided. The method may comprise obtaining, by a wireless communications device (WCD), a destination device identifying item, transmitting the destination device identifying item to a contextual content server, wherein the contextual content server determines one or more contextually relevant content items by processing the received destination device identifying item and a WCD location value, and receiving, from the contextual content server, at least one of the one or more contextually relevant content items.

57 Claims, 9 Drawing Sheets

(56) References Cited

U.S. PATENT DOCUMENTS

| | | | |
|---|---|---|---|
| 2007/0297587 A1* | 12/2007 | Urban et al. | 379/142.17 |
| 2008/0045138 A1* | 2/2008 | Milic-Frayling et al. | 455/3.04 |
| 2008/0167019 A1 | 7/2008 | Guedalia et al. | |
| 2008/0192736 A1 | 8/2008 | Jabri et al. | |
| 2008/0215692 A1* | 9/2008 | Bosarge et al. | 709/206 |
| 2008/0275785 A1 | 11/2008 | Altberg et al. | |
| 2010/0082397 A1* | 4/2010 | Blegen | 705/10 |

FOREIGN PATENT DOCUMENTS

| | | |
|---|---|---|
| EP | 1910926 A1 | 4/2008 |
| GB | 2434230 | 7/2007 |
| JP | 5304563 A | 11/1993 |
| JP | 2003101644 A | 4/2003 |
| JP | 2006227855 A | 8/2006 |
| JP | 2007511116 A | 4/2007 |
| JP | 2008203014 A | 9/2008 |
| KR | 20040090330 A | 10/2004 |
| KR | 20060012301 A | 2/2006 |
| KR | 20070020078 A | 2/2007 |
| KR | 20070032018 A | 3/2007 |
| KR | 20070120095 A | 12/2007 |
| WO | WO199857506 | 12/1998 |
| WO | 2004105352 A1 | 12/2004 |
| WO | 2005041540 A2 | 5/2005 |
| WO | 2006000968 A1 | 1/2006 |
| WO | 2006011122 A1 | 2/2006 |
| WO | 2006113112 A2 | 10/2006 |
| WO | WO2007008929 A2 | 1/2007 |
| WO | 2007080413 A1 | 7/2007 |

OTHER PUBLICATIONS

Taiwan Search Report—TW098142739—TIPO—dated Jan. 9, 2013.
Written Opinion—PCT/US2009/067773—ISA/EPO—dated Apr. 8, 2010.

* cited by examiner

METHOD AND APPARATUS FOR OBTAINING CONTEXTUALLY RELEVANT CONTENT

CLAIM OF PRIORITY UNDER 35 U.S.C. § 119

The present application for patent claims priority to Provisional Application No. 61/121,861 filed Dec. 11, 2008, and assigned to the assignee hereof and hereby expressly incorporated by reference herein.

BACKGROUND

Field

The disclosed aspects relate to contextual communications between content providers and wireless communications devices over a network.

Background

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Further, many such cellular telephones are being manufactured with relatively large increases in computing capabilities, and as such, are becoming tantamount to small personal computers and hand-held PDAs. However, unlike current small personal computers these devices content providers are constrained in providing content of interest. For example, the screen size, amount of available memory and file system space, amount of input and output capabilities and processing capability may each may limit the device in being provided content of interest by a content provider.

Currently, users have limited options for being provided content for an establishment and/or entity, for example through a dialed phone number. Thus, improved apparatus and methods for providing contextually relevant content to a wireless communications device (WCD) are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with obtaining contextually relevant content by a wireless communications device. According to one aspect, a method for obtaining contextually relevant content by a wireless communications device is provided. The method can comprise obtaining, by a wireless communications device (WCD), a destination device identifying item. Further, the method can comprise transmitting the destination device identifying item to a contextual content server, wherein the contextual content server determines one or more contextually relevant content items by processing the received destination device identifying item. Moreover, the method can comprise receiving, from the contextual content server, at least one of the one or more contextually relevant content items.

Yet another aspect relates to at least one processor configured to obtain contextually relevant content by a wireless communications device. The at least one processor can include a first module for obtaining, by a wireless communications device (WCD), a destination device identifying item. Further, the at least one processor can include a second module for transmitting the destination device identifying item to a contextual content server, wherein the contextual content server determines one or more contextually relevant content items by processing the received destination device identifying item. Moreover, the at least one processor can include a third module for receiving, from the contextual content server, at least one of the one or more contextually relevant content items.

Still another aspect relates to a computer program product comprising a computer-readable medium. The computer-readable medium can include a first set of codes for causing a computer to obtain, by a wireless communications device (WCD), a destination device identifying item. Further, the computer-readable medium can include a second set of codes for causing the computer to transmit the destination device identifying item to a contextual content server, wherein the contextual content server determines one or more contextually relevant content items by processing the received destination device identifying item. Moreover, the computer-readable medium can include a third set of codes for causing the computer to receive, from the contextual content server, at least one of the one or more contextually relevant content items.

Yet another aspect relates to an apparatus. The apparatus can include means for obtaining, by a wireless communications device (WCD), a destination device identifying item. Further, the apparatus can comprise means for transmitting the destination device identifying item to a contextual content server, wherein the contextual content server determines one or more contextually relevant content items by processing the received destination device identifying item. Moreover, the apparatus can comprise means for receiving, from the contextual content server, at least one of the one or more contextually relevant content items.

Another aspect relates to a wireless communications device (WCD). The WCD can include a communications module operable for: obtaining, by a wireless communications device (WCD), a destination device phone number, transmitting the destination device phone number to a contextual content server, wherein the contextual content server determines one or more contextually relevant content items by processing the received destination device phone number, and receiving, from the contextual content server, at least one of the one or more contextually relevant content items.

Additionally, in accordance with one or more aspects and corresponding disclosure thereof, various aspects are described in connection with providing contextually relevant content to a wireless communications device (WCD). According to one aspect, a method for providing contextually relevant content to a WCD is provided. The method can comprise receiving, by a contextual content server, a destination device identifying item from a WCD. Further, the method can comprise determining one or more contextually relevant content items by processing the received destination device identifying item. Moreover, the method can comprise transmitting at least one of the one or more contextually relevant content items to the WCD.

Yet another aspect relates to at least one processor configured to provide contextually relevant content to a wireless communications device (WCD). The at least one processor can include a first module for receiving, by a contextual content server, a destination device identifying item from a WCD. Further, the at least one processor can include a second module for determining one or more contextually relevant content items by processing the received destination device identifying item. Moreover, the at least one processor can include a third module for transmitting at least one of the one or more contextually relevant content items to the WCD.

Still another aspect relates to a computer program product comprising a computer-readable medium. The computer-readable medium can include a first set of codes for causing a computer to receive, by a contextual content server, a destination device identifying item from a WCD. Further, the computer-readable medium can include a second set of codes for causing the computer to determine one or more contextually relevant content items by processing the received destination device identifying item. Moreover, the computer-readable medium can include a third set of codes for causing the computer to transmit transmitting at least one of the one or more contextually relevant content items to the WCD.

Yet another aspect relates to an apparatus. The apparatus can include means for receiving, by a contextual content server, a destination device identifying item from a WCD. Further, the apparatus can comprise means for determining one or more contextually relevant content items by processing the received destination device identifying item. Moreover, the apparatus can comprise means for transmitting at least one of the one or more contextually relevant content items to the WCD.

Another aspect relates to an apparatus. The apparatus can include a communications module operable for receiving, by a contextual content server, a destination device identifying item from a WCD. Further, the apparatus can include a contextual content module operable for determining one or more contextually relevant content items by processing the received destination device identifying item. Moreover, the apparatus communications module can further operable for transmitting at least one of the one or more contextually relevant content items to the WCD.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The communication of contextually relevant content to a wireless device may be accomplished through interactions with a contextual content server over a network. In particular, the present aspects enable wireless devices to obtain contextually relevant content items in response to attempting to communicate with another device. For example, when making a communication request to another device or, when receiving a communication request from another device. Further, a contextual content server may store and/or track communications amongst devices and use such information to focus relevancy of transmitted content items to devices and/or to provide aggregated user profile information to content and/or service providers for further analysis.

Figure 1:
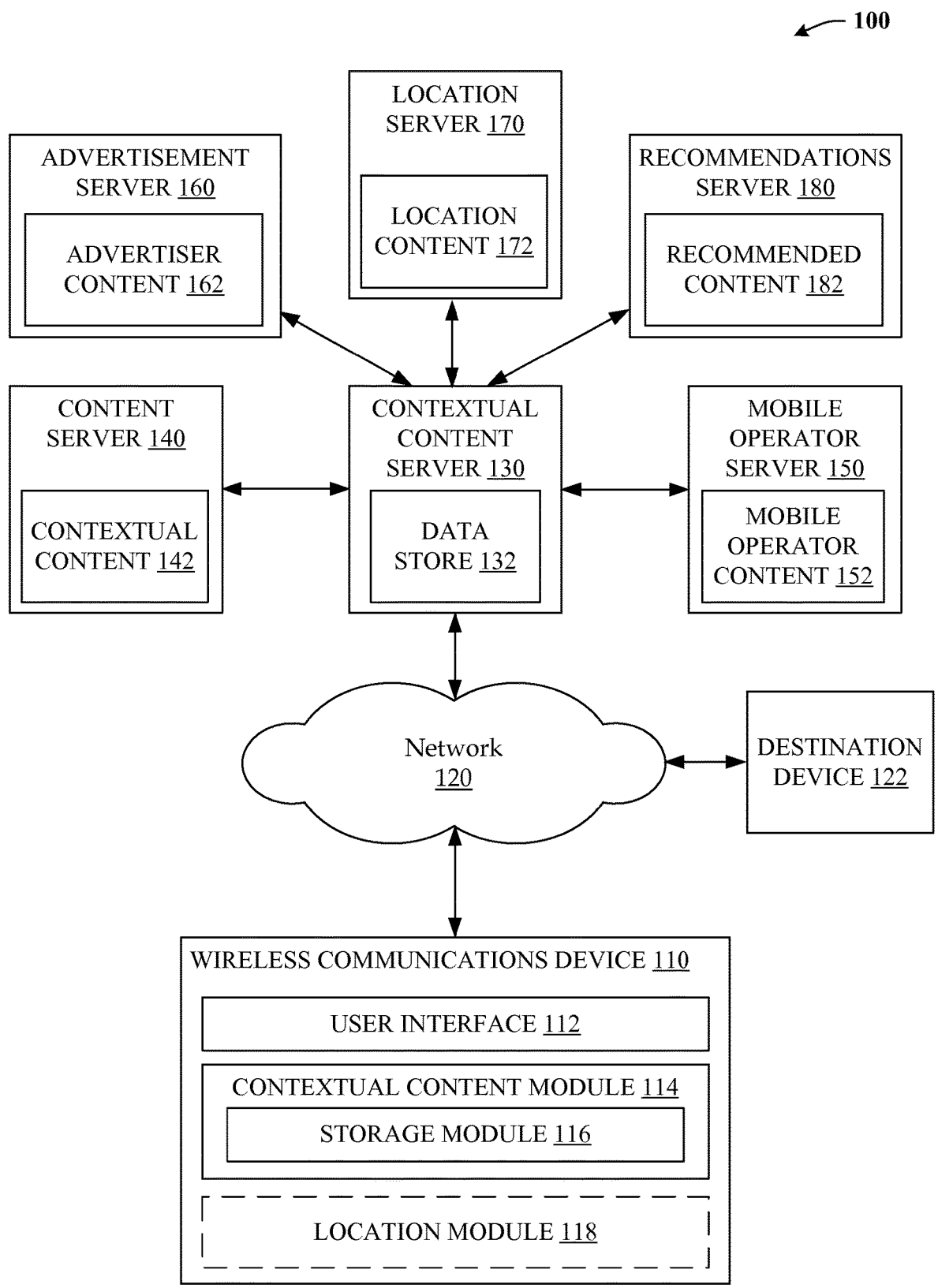
FIG. 1 illustrates a block diagram of a communication network according to an aspect.

With reference to FIG. 1, a block diagram of a communication network system 100 according to an aspect is illustrated. Communication system 100 may include one or more of communications devices 110, 122 connected to a network 120, e.g., a CDMA network, a GPRS network, a UMTS network, and other types of communication networks. Communication system 100 may further include a plurality of servers 130, 140, 150, 160, 170, 180 connected to network 120. In one aspect, the plurality of servers includes contextual content server 130, content server 140, mobile operator server 150, advertisement server 160, location server 170, and recommendations server 180. In one aspect, contextual content server 130 may obtain one or more of: contextual content 142 from content server 140, mobile operator content 152 from mobile operator server 150, advertiser content 162 from advertisement server 160, location content 172 from location server 170 and recommendations content 180 from recommendations server 180.

In one aspect, communications device 110 may further include user interface 112, contextual content module 114 and optionally a location module 118. In one aspect, contextual content module 114 may further include storage module 116 to facilitate further analysis such as, user device information analysis, destination device information analysis, etc. In one aspect, contextual content server 130 may further include data store 132 to store user information received from a plurality of devices, such as devices 110, 122, and/or servers, such as content server 140, mobile operator server 150, advertisement server 160, location server 170, and recommendations server 180. In such an aspect, contextual content server 130 may bias towards transmission of certain content items through analysis of information stored in data store 132. For example, information is received from device 110 that a previously provided contextual content item did not perform properly, then contextual content server 130 may discontinue distribution of such an content item and may alert the content provider 140. In another example, contextual content server 130 may determine, through aggregating multiple user actions stored in data store 132, users who called a specific number also often looked at content associated with a specific product. In such an exemplary case, a contextual relevant content item related to the specific product may be provided to the device 110 when the specific number is dialed.

In one aspect, content server 140 may further include contextual content items 142. Such content items may include: coupons, advertisements, announcements, etc., associated with products, services, individuals, groups, locations, etc. For example, content server 140 may provider contextual content items 142 associated with a specific category of business. In such an aspect, a user may obtain a destination device identifying item, such as by dialing a number, receiving a call from a number, generating and/or receiving an audio based message, generating and/or receiving a textually based message. Such an audio based message may include, but is not limited to, a voice mail, a music file, etc. Such a textually based message may include, but is not limited to, a short message service (SMS) message, an enhanced messaging service message (EMS) message, a multimedia message service (MMS) message. In one example the contextual content server 130 may associate the dialed number and/or the calling number with a florist and may provide content items for the dialed florist and/or for other florists in the area.

In another example, the contextual content server 130 may parse received SMS text for tags, keywords, hash tags, etc. and may associate the parsed information with one or more contextually relevant content items. For example, a user may send an SMS message including reference to a specific book. In such an instance, the contextual content server 130 may parse the message and provide a list of bookstores located near the user, coupons for the specific book, other books by the same author, reviews of the specific book, etc., as contextually relevant content.

In still another example, the contextual content server 130 may analyze the content of the audio file for tags, keywords, etc. and may associate the analyzed information with one or more contextually relevant content items. For example, if a user receives a voicemail in which the name of an entertainer is mentioned, then the contextual content server 130 may analyze the message and provide venues, dates, ticket availability, etc. for when said entertainer is next performing within a predetermined distance of the location of the communications device 110.

In one aspect, mobile operator server 150 may further include mobile operator content items 152. Such content items may include: coupons, advertisements, announcements, etc., associated with products, services, individuals, groups, locations, etc. For example, if a user calls a specific number and/or receives a call from a specific number multiple times, then contextual content server 130 may provide service plan options from the mobile operator that better serve the users calling habits. In another example, if user calls a number of a doctor and mobile operator has mobile applications related to 'health', then the Mobile Operator can provide such applications more often to the particular user.

In operation, a user accesses a destination identifier such as a phone number associated with another device and/or entity using user interface 112. For example, a user may input a destination identifier into a user interface 112 of device 110. In another example, a user may view the destination identifier using user interface 112 of device 110 on receiving a voice call from another device. In yet another example, a user may view the destination identifier stored in address book associated with device 110 using user interface 112 of device 110. Thereafter, destination identifying information, and device information may be transmitted to contextual content server 130. In one aspect, device information may include a location value determined by location module 118. In another aspect, device information may include, make and model information for the device 110, screen size, available storage space in storage module 116, user profile information, etc. Upon receiving the destination device identifying information, contextual content server 130 may process connecting device 110 with destination device 122. Contemporaneously, contextual content server 130 may analyze, among other information, received destination device information and device 110 information and determine relevant contextual content items to transmit to device 110. In such an aspect, relevancy may be analyzed with respect to the destination device 122, the wireless communication device 110, a content server 140, a mobile operator 150, etc. Thereafter, contextual content server 130 may transmit relevant contextual content items to device 110. In one aspect, transmissions may occur, prior to connection with the destination device 122, during communications with the destination device 122 and/or after termination of communications with the destinations device 122. As such, contextually relevant content items may be provided to a device 110 in response to attempted communications with a destination device 122.

Figure 2:
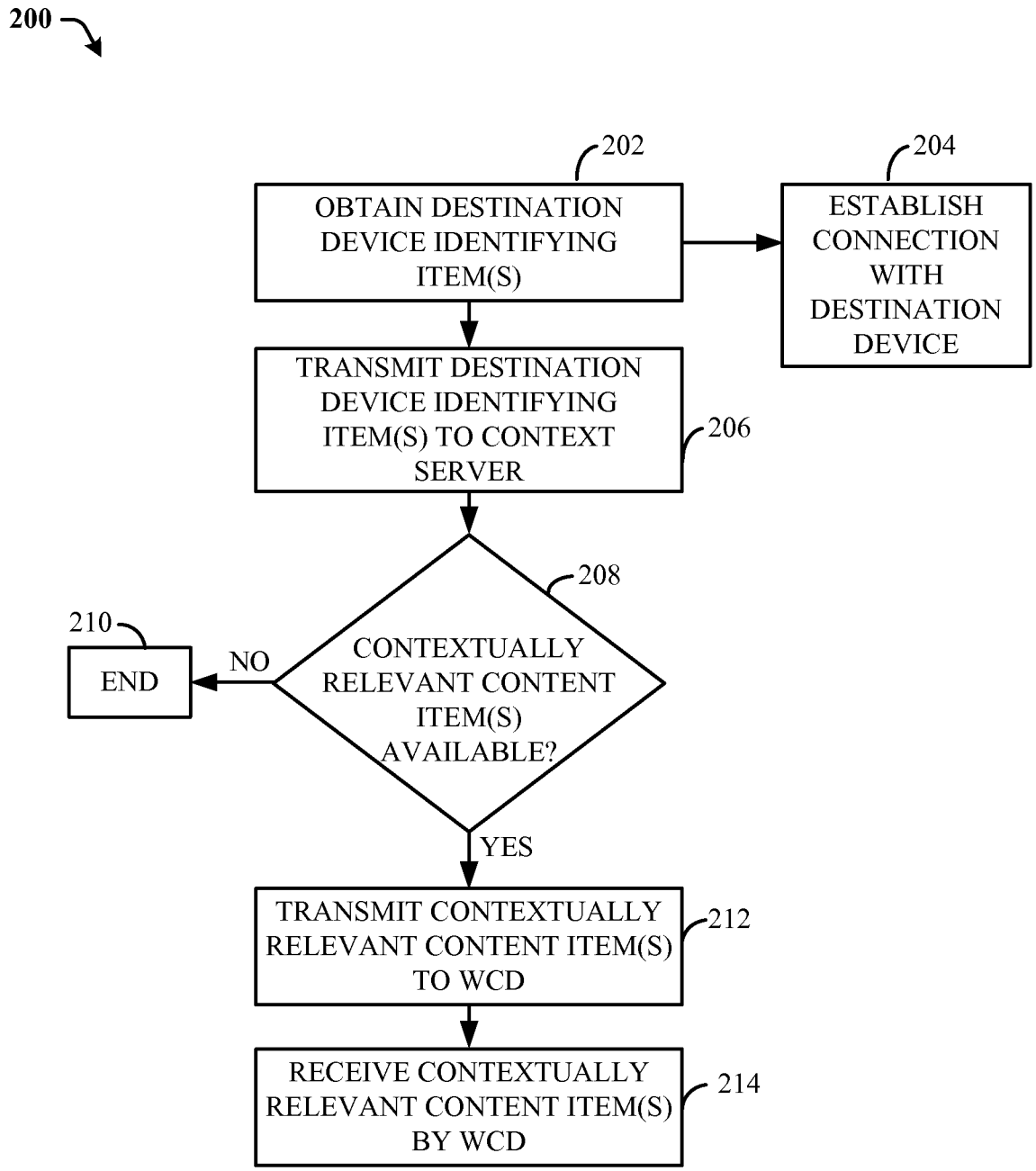
FIG. 2 illustrates a flow chart depiction of operation of an aspect depicted in FIG. 1.

FIG. 2 illustrates various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring to FIG. 2, at reference numeral 202, a destination device identifying item may be obtained. In one aspect, the obtaining the destination device identifying item further may include: receiving a user inputted phone number from a user interface associated with the WCD, receiving a user inputted phone number from an address book associated with the WCD, receiving a user inputted value from a plurality of mobile operator provided values, receiving the destination device identifying item from the incoming call, etc. In another aspect, the destination device identifying item may be used for communication of a short message service data packet.

At reference numeral 204, a connection may be made with a device and/or entity identified using the destination device phone. In one aspect, the connection may be made before acts described in reference numerals 206 through 214 occur. In another aspect, the connection may be made while acts described in reference numerals 206 through 214 occur. In yet another aspect, the connection may be made after acts described in reference numerals 206 through 214 occur. In still another aspect, the timing of connecting with the described device may be determined through the network used to facilitate the communications. For example, a CDMA network currently does not allow simultaneous communications for voice and data. By contrast, a UMTS network provides for communication of voice and data, and as such, content items may be provided to a device during a voice conversation.

At reference numeral 206, the destination device identifying item is transmitted to a context server. In one aspect, the contextual content server may receive additional information, such as a name corresponding to the destination device identifying item stored in the address book, an address corresponding to the destination device identifying item, user profile information and/or any other information present in the address book that may be relevant.

At reference numeral 208, it is determined whether any contextually relevant content items may be available. In one aspect, the contextual content server may determine relevancy of contextually relevant content items with respect: a WCD location value, a location associated with the destination device identifying item, a business or business category associated with the destination device identifying item, information obtained from an advertisement server, information obtained from a recommendations server, information obtained from a location server, information obtained from a mobile operator associated with the WCD, etc. In such an aspect, contextually relevant content items determined with respect to the WCD location value may include: weather information, local news feeds, local events, local time, a local country specific exchange rate, a local country specific stock index trigger, one or more social networking site feed associated with a user of the WCD, one or more point of interest associated with the business category for the destination device identifying item within a predefined distance from the WCD location value, map information, map information for the at least one of the one or more points of interest, one or more recommendations for other businesses, coupons or directions to the location associated with the destination device identifying item, etc. Further, in such an aspect, contextually relevant content items determined with respect to the location associated with the destination device identifying item may include: weather information, local news feeds, a business name, a business address, a business category, one or more points of interest associated with the business category within a predefined distance, map information, map information for the at least one of the one or more points of interest associated with the business category, one or more businesses related to the business category, recommendations for the one or more businesses related to the business category, directions to at least one of the one or more businesses related to the business category, or directions from the WCD location value to the location associated with the destination device identifying item, etc. Additionally, in such an aspect, contextually relevant content items determined with respect to the mobile operator, advertisement server, location server, etc. associated with the WCD may include: one or more advertisements associated with the mobile operator, one or more advertisements from one or more content providers associated with the mobile operator, one or more advertisements associated with a business category for the destination device identifying item, one or more advertisements associated with a user profile for a user associated with the WCD, etc.

If at reference numeral 208, it is determined no contextually relevant content items are available, then at reference numeral 210 the process may stop. By contrast, if at reference numeral 208, it is determined that one or more contextually relevant content items are available, then at reference numeral 212 at least one of the one or more contextually relevant content items are transmitted to the device from which the destination device identifying item was received.

Further, at reference numeral 214, the one or more transmitted contextually relevant content items are received by the device. In one aspect, the receiving may include receiving during one or more operational intervals, such as, an interval prior to initiating a communication connection with the destination device identifying item an interval prior to a communication connection being completed to the destination device identifying item, an interval during communications after the communication connection is established, or an interval after the communication connection is terminated.

Figure 3A:
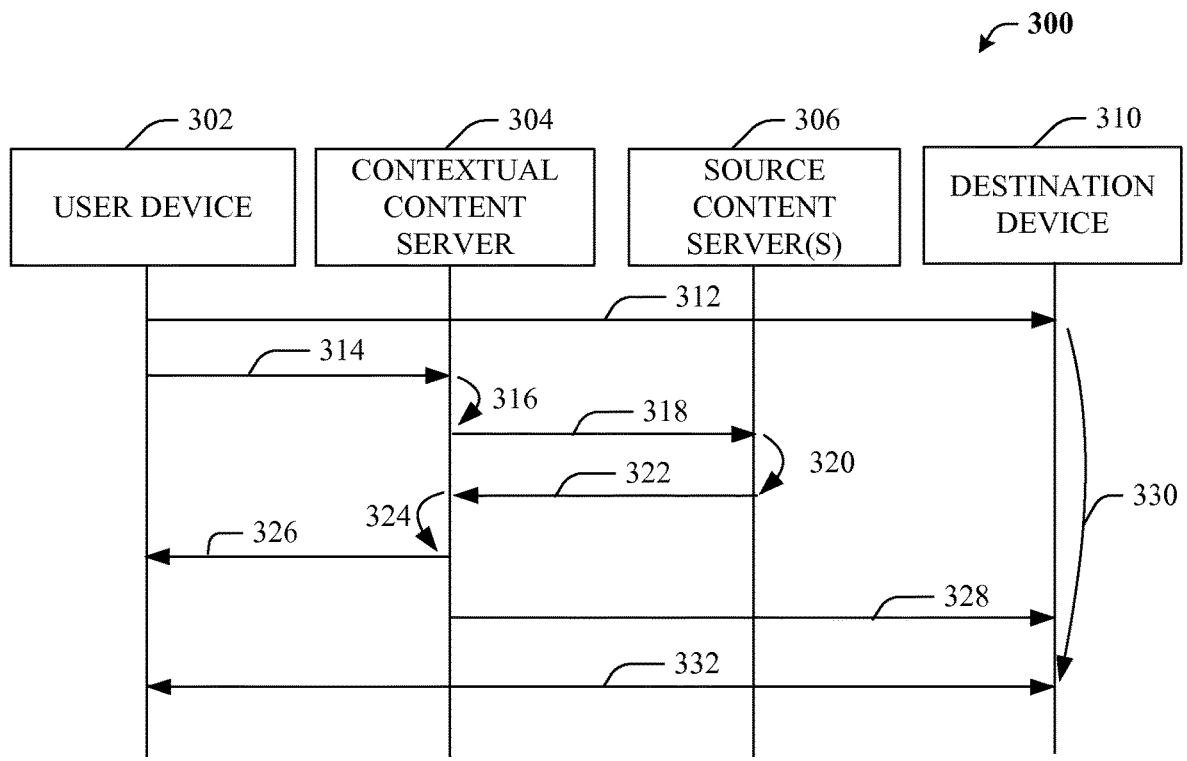
FIG. 3A illustrates a message sequence chart of operation of a communications device calling a destination device, according to an aspect.

With reference to FIG. 3A, operation of the subject matter depicted in FIG. 1 for establishing a call with a destination device in the form of a message sequence diagram is illustrated. Generally, a communications device 302, may attempt to interact with a destination device 310. Such interactions may be augmented through contextual content server 304 with content provided by one or more source content servers 306.

At sequence step 312, destination device 310 identifying information is transmitted from wireless communication device 302 to destination device 310 to establish a communication path. In one aspect, the destination device identifying information may include, a phone number, an IP address, a MAC address, a URL, email address, a short message service (SMS) data packet, an enhanced messaging service (EMS) data packet, a multimedia message service (MMS) data packet, etc. In such an aspect, the phone number may be associated with various communication protocols, such as VoIP communications, PSTN communications, etc. In another aspect, the wireless communication device 302 may obtain the destination device 310 identifying information by: receiving a user inputted phone number from a user interface associated with the WCD, receiving a user inputted phone number from an address book associated with the WCD, receiving a user inputted value from a plurality of mobile operator provided values, etc. At sequence step 314, destination device 310 identifying information is also transmitted from wireless communication device 302 to contextual content server 304. At sequence step 316, contextual content service processes the information received from wireless communication device 302. In one aspect, such information may include a location value for the wireless communication device 302. In such an aspect, the location value may correspond to a device physical location based on: GPS obtained data, extracting location from the area code of the device phone number, extracting location from the area code of the of the destination device identifying item, etc. In another aspect, device information may further include: make and model information for the wireless communication device 302, screen size, available storage space, user profile information, etc. In yet another aspect, processing further includes selecting at least one contextual relevant content item for transmission to wireless communication device 302. In one aspect, contextual content server 304 may determine relevancy of contextually content items with respect: the WCD location value, destination device identifying information, information obtained from a mobile operator associated with the WCD, etc.

At sequence step 318, contextual content server 304 may provide user profile information, or the like, to one or more source content servers 306. In one aspect, contextual content server 304 aggregates user profile information from multiple users and/or over a set duration prior to transmitting information to the one or more source content servers 306. For example, contextual content server 304 may provide information associated to user call patterns with respect to certain establishments. At sequence step 320, at least one source content server 306 may process information received from contextual content server 304. In one aspect, the one or more source content servers may include: content server 140, mobile operator server 150, advertisement server 160, location server 170, and recommendations server 180. Further, such processing may include selecting which content item and/or items to provide for transmission to user devices (e.g., advertisements, coupons, recommendations, local news, weather, time, directions to a destination device business or related businesses; etc.). At sequence step 322, contextually relevant content items are transmitted to content server 304. In one aspect, such transmissions are provided in response to a user request, such as at sequence step 314. In another aspect, such transmissions are provided in response to contextual content server transmissions, such as transmissions of aggregated user information at predetermined intervals. In another aspect, such transmissions occur periodically. In still another aspect, such transmission occur as a result of a triggering event occurring such as user accessing address book, whereby at least a portion of the contents of an address book may be sent to contextual content server 304 which may iterate through each received entry (e.g. name, phone number in the address book). In such an aspect, in operation, contextual server 304 may collect contextually relevant information from source content servers 306 such as content server 140, mobile operator server 150, advertisement server 160, location server 170, and recommendations server 180 and may send compiled information back to device 302. As such, the accessed address book may be then updated with the received content information.

At sequence step 324, contextual content server 304 may further process contextual content items received from source content server 306. In one aspect, content items may be stored at contextual content server 304 for subsequent transmissions. In another aspect, content server 306 metrics may be stored and/or analyzed to facilitate billing, auditing, streamlining, etc., for the content server 306. At sequence step 326, selected relevant contextual content items are transmitted to user device 302. For example, if a user is calling a ticket line for a specific venue, then content items associated with acts performing at the venue may be transmitted to the user device 302.

At sequence step 328, contextual content server 304 may use destination device identifying information to communication with destination device 310. In one aspect, contextual content items may be provided to destination device 310. At sequence step 330, destination device may determine whether to the accept communication request from user device 302, and at sequence step 332 a communication path may be established.

Figure 3B:
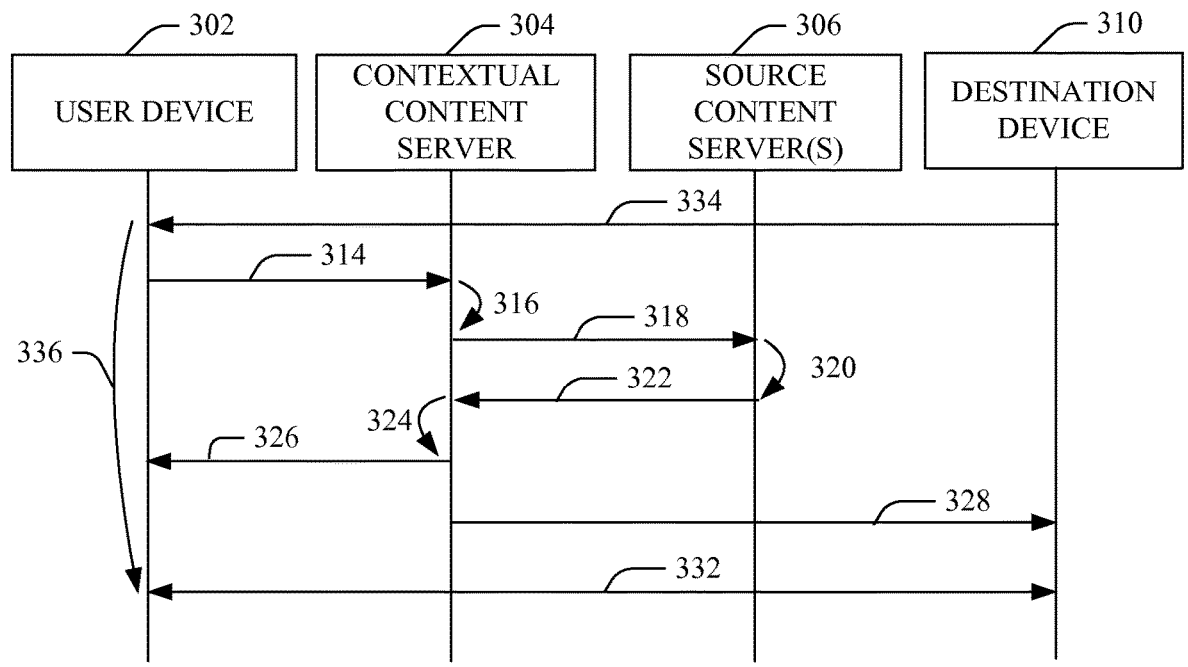
FIG. 3B illustrates a message sequence chart of operation of a communications device receiving a call from a destination device, according to an aspect.

With reference to FIG. 3B, operation of the subject matter depicted in FIG. 1 in the form of a message sequence diagram for receiving a call from a destination device is illustrated. For sake of clarity sequence steps which perform substantially similarly to as is depicted in FIG. 3A are numbered with respect to the numbering used in FIG. 3A.

At sequence step 334, destination device 310 receiving identifying information transmitted from destination device 310 to user device 302 to establish a communication path. Sequence steps 314 through 332 perform substantially similarly to the sequence steps described with reference to FIG. 3A. Thereafter, at sequence step 336, user device 302 may determine whether to the accept communication request from destination device 310, and at sequence step 332 a communication path may be established.

In one aspect, contextually relevant content items transmitted to device 302, such as at sequence step 326, may be transmitted to user device 302 prior to connection with destination device 310 (such as depicted in FIG. 3), during communications with destination device 310, and/or after termination of communications with device 310. In another aspect, determining when contextually relevant content may be transmitted to device 302 may be determined through the network through which communications are processed. For example, currently CDMA network may not facilitate communication of contextual content during active communications between devices 302 and 310.

Figure 4:
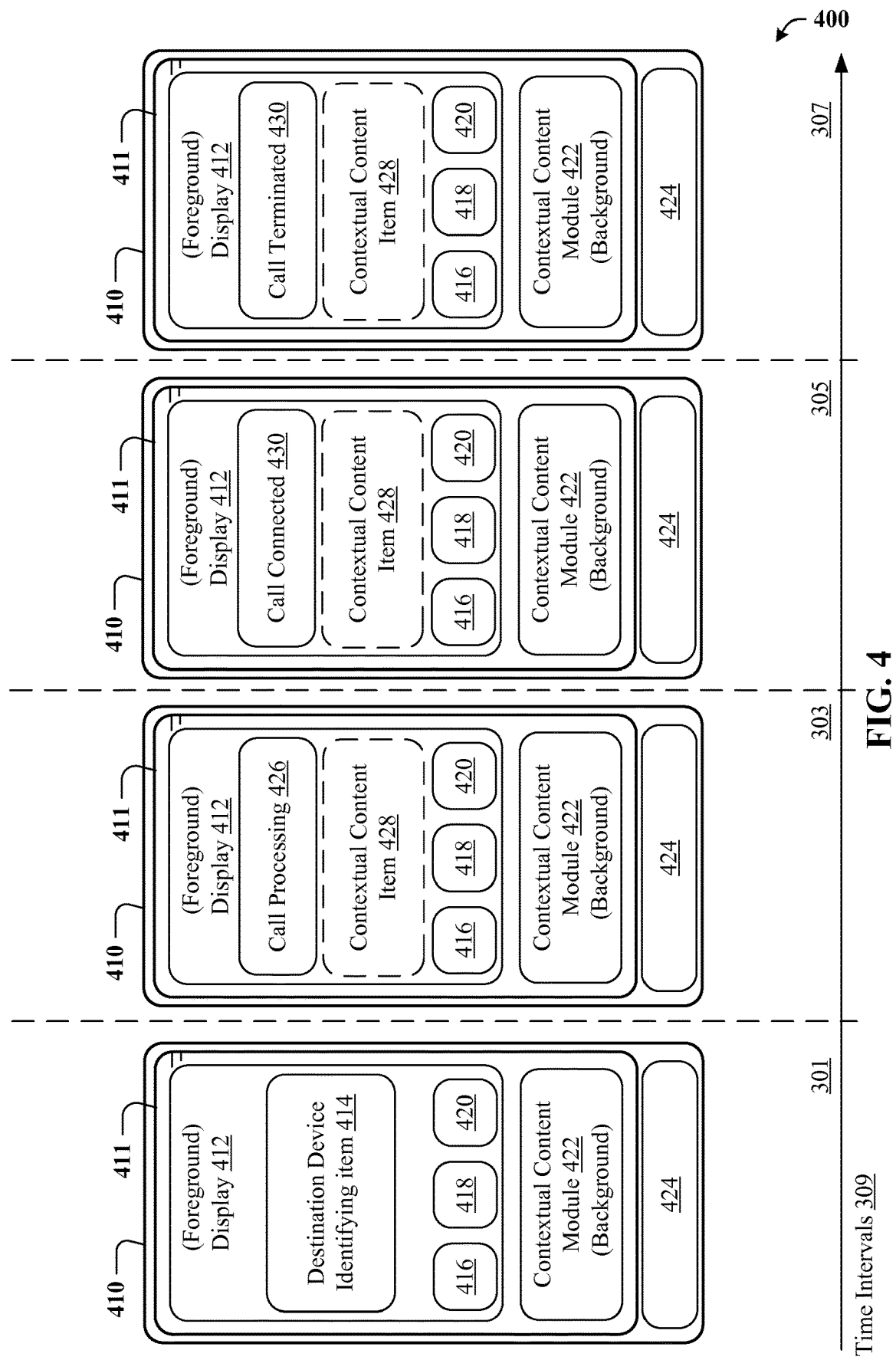
FIG. 4 illustrates exemplary screen shots over multiple time intervals of a communications device calling a destination device identifying item, according to an aspect.

With reference to FIG. 4, exemplary screen shots depicting an interaction between two applications on a communications device 410 in a communication system 400 as device 410 makes a call as time 309 progresses, as indicated by the left-to-right arrow. As depicted, communications device 410 may include input mechanisms 424 for generating inputs into communications device 410, and output mechanism 411 for generating information for consumption by the user of communications device 410. For example, input mechanism 424 may include a mechanism such as a key or keyboard, a mouse, a touch-screen display, a microphone, etc. Further, for example, output mechanism 411 may include a display 412, an audio speaker, a haptic feedback mechanism, a Personal Area Network (PAN) transceiver, etc. In such an exemplary aspect, output mechanism 411 may display an input phone number from the incoming call, or bringing up address book application on the device 410 which may already include phone numbers. In the illustrated aspects, the output mechanism 411 may include a display 412 operable to present media content that is in image or video format and/or an audio speaker to present media content that is in an audio format. In one aspect, a user may be interacting with a selected application, such as a destination device identifying application 414, in the foreground, while a contextual content application 422 may be running in the background. In another aspect, the contextual content application 422 may register for a call, event etc., (incoming/outgoing) with the device operating system and may be invoked when any of the registered events occurs. Furthermore, in the depicted aspect, communications device 410 presents a user with a display 412 including options for a plurality of additional content items, such as maps/directions 416, coupons 418, advertisements 420, etc.

In the depicted aspect, at the first time interval 301, destination device identifying module (e.g. a destination device phone number, a short message service user input) 414 may be running in the foreground while contextual content module 422 may be running in the background of communications device 410. In one aspect, during time interval 401, contextually relevant content may be displayed through display 412. For example, a user may run an application, such as a web browser. In such an exemplary aspect, when a user provides an selection associated with a number displayed through the web browser then contextually relevant content may be provided associated with the user selection. Furthermore, in the depicted aspect at time interval 401, a user may provide a destination device identifying selection, e.g., user stored name for that phone number, user stored address for that phone number, etc. In one aspect, the attempted connection with the destination device may use an applicable protocol employed by the wireless network. Thereafter, destination device identifying information and device 410 identifying information are transmitted to a contextual content server to facilitate providing contextually relevant content to the device 410. At time interval 303, the contextual content server may provide contextually relevant content items 428 while the connection with the destination device is processing 426. At time interval 305, a connection may be established with the destination device. In such a time interval, in one aspect, while the connection is established 430, the contextual content server may provide contextually relevant content items 428. Still further, at time interval 307, after communications with a destination device have been terminated 430, the contextual content server may provide contextually relevant content items 428. It should be additionally noted, that the contextually relevant content may be provided to the user at various states (e.g. before making a call 401, while connecting a call 403, while call is already connected 405, after call is completed 407) and may be different at each state (e.g. the content may not be the same across these different states or any other states).

Figure 5:
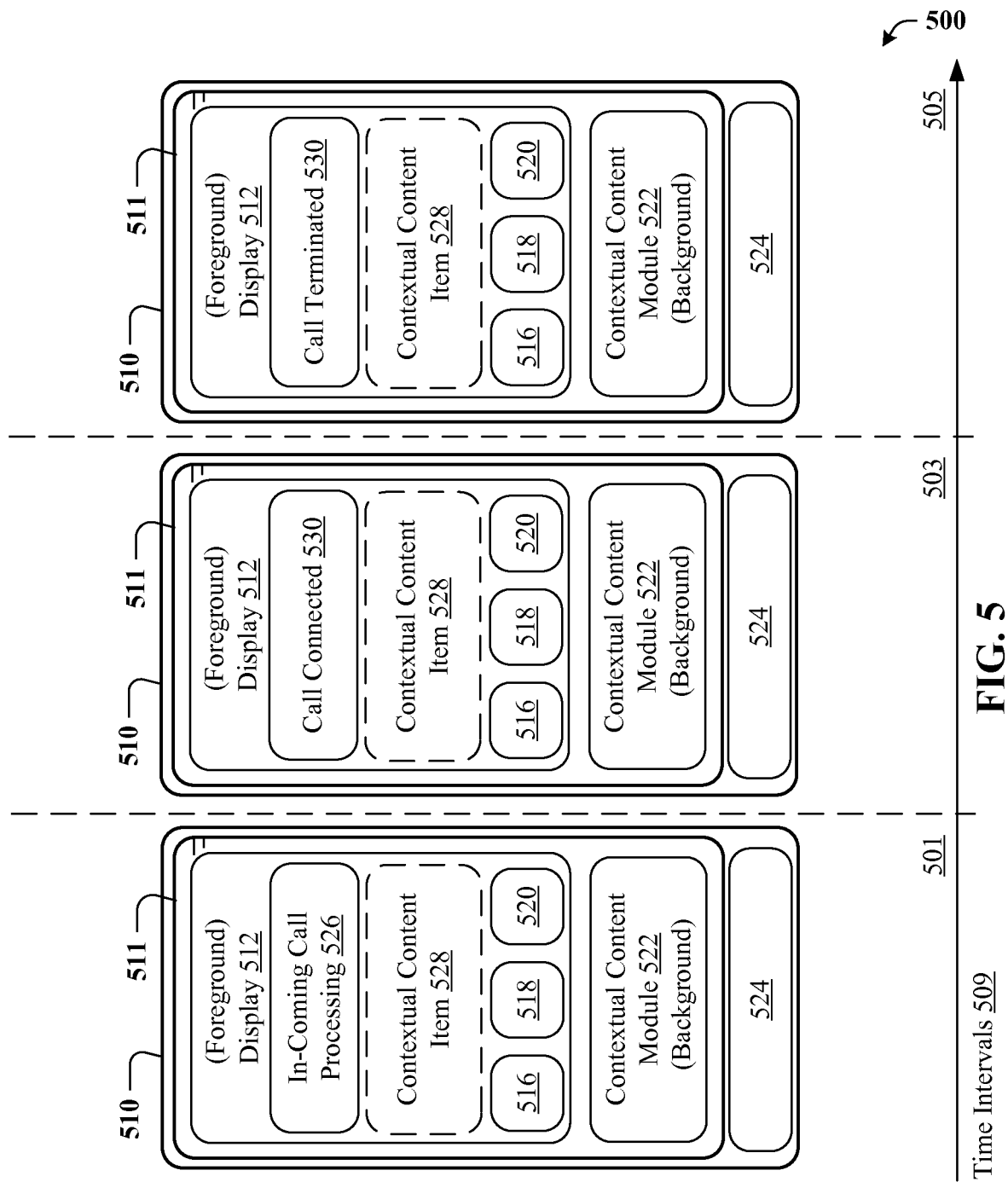
FIG. 5 illustrates exemplary screen shots over multiple time intervals of a communications device receiving a call from a phone number, according to an aspect.

With reference to FIG. 5, exemplary screen shots depicting an interaction between two applications on a communications device 510 in a communication system 500 as device 510 receives a call and as time 509 progresses, as indicated by the left-to-right arrow. As depicted, communications device 510 may include input mechanisms 524 for generating inputs into communications device 510, and output mechanism 511 for generating information for consumption by the user of communications device 510. For example, input mechanism 524 may include a mechanism such as a key or keyboard, a mouse, a touch-screen display, a microphone, etc. Further, for example, output mechanism 511 may include a display 512, an audio speaker, a haptic feedback mechanism, a Personal Area Network (PAN) transceiver, etc. In such an exemplary aspect, output mechanism 511 may display an input phone number from the incoming call, or may bringing up address book application on the device 510 which may already include phone numbers. In the illustrated aspects, the output mechanism 511 may include a display 512 operable to present media content that is in image or video format and/or an audio speaker to present media content that is in an audio format. In one aspect, a user may be interacting with a selected application, such as a destination device identifying application 514, in the foreground, while a contextual content application 522 may be running in the background. In another aspect, the contextual content application 522 may register for a call, event etc., (incoming/outgoing) with the device operating system and may be invoked when any of the registered events occurs. Furthermore, in the depicted aspect, communications device 510 presents a user with a display 512 including options for a plurality of additional content items, such as maps/directions 516, coupons 518, advertisements 520, etc.

In the depicted aspect, at the first time interval 501, an in-coming call processing state 526 may occur. In one aspect, the contextual content server may provide contextually relevant content items 528 while the connection with the user device 510 is processing. At time interval 503, after user device 510 has accepted the call, a connection may be established between the destination device and user device 510. In such a time interval, in one aspect, while the connection is established 530, the contextual content server may provide contextually relevant content items 528. Still further, at time interval 505, after communications with a destination device have been terminated 530, the contextual content server may provide contextually relevant content items 528. It should be additionally noted, that the contextually relevant content may be provided to the user at various states (e.g. while a call is incoming 501, while call is already connected 503, after call is completed 505) and may be different at each state (e.g. the content may not be the same across these different states or any other states).

In one aspect, the availability of contextually relevant content items 528 may be determined through the network used to facilitate the communications. For example, a CDMA network currently does not allow simultaneous communications for voice and data. By contrast, a UMTS network provides for communication of voice and data, and as such, content items may be provided to a device during a voice conversation. Further, in one aspect, device operations may limit availability of contextual content. For example, as a wireless device may be placed need a user's ear during calls, providing content during such communications may not be cost effective. In such an exemplary aspect, device functional information such as, whether a speaker phone option is being used, etc., may assist in determining when to provide content items to a device. Additionally or in the alternative, output mechanisms to attract user's attention to the phone screen may be employed, e.g., a beep, or vibration, etc.

Figure 6:
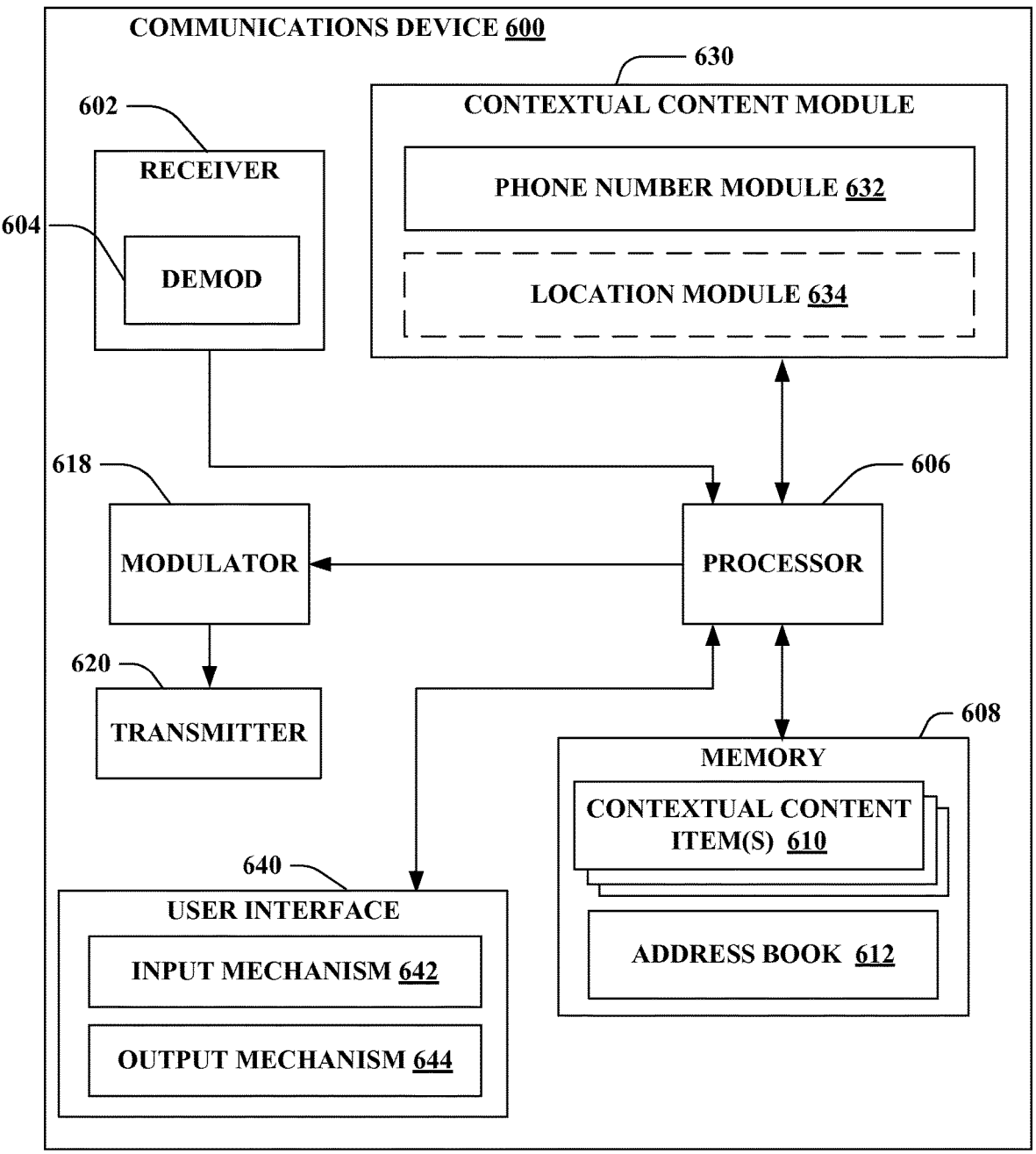
FIG. 6 illustrates a block diagram example architecture of a communications device.

While still referencing FIG. 1, but turning also now to FIG. 6, an example architecture of communications device 110 is illustrated. As depicted in FIG. 6, wireless device 600 comprises receiver 602 that receives a signal from, for instance, a receive antenna (not shown), performs typical actions on (e.g., filters, amplifies, downconverts, etc.) the received signal, and digitizes the conditioned signal to obtain samples. Receiver 602 can comprise a demodulator 604 that can demodulate received symbols and provide them to processor 606 for channel estimation. Processor 606 can be a processor dedicated to analyzing information received by receiver 602 and/or generating information for transmission by transmitter 620, a processor that controls one or more components of mobile device 600, and/or a processor that both analyzes information received by receiver 602, generates information for transmission by transmitter 620, and controls one or more components of mobile device 600. Further, process 606 may process and/or generate messages for communication using any or many available protocols. For example, such protocols can include hypertext transfer protocol (HTTP), an Internet Protocol (IP) socket protocol, a short message service (SMS) protocol, and any wired and/or wireless network protocols, such as code division multiple access (CDMA)-based protocols and global system for mobile communications (GSM)-based protocols.

Mobile device 600 can additionally comprise memory 608 that is operatively coupled to processor 606 and that can store data to be transmitted, received data, information related to available channels, data associated with analyzed signal and/or interference strength, information related to an assigned channel, power, rate, or the like, and any other suitable information for estimating a channel and communicating via the channel. In one aspect, memory 608 can include one or more contextual content items 610, such as but not limited to: advertisements, coupons, weather information, recommendations on related businesses (e.g., if a user makes a call to a pizza store then information on nearby movie rental store may be provided), local news feeds about the destination, local time at the destination, social networking site feeds, points of interest near a WCD, map information, map information for at least one point of interest associated with the business category of a destination device within a predefined distance of the WCD location value, directions to the location associated with a destination device identifying item, tourism information for the destination, advertisement for a flight from user's calling city to the destination city corresponding to the phone number, etc. In one aspect, memory 608 may further comprise address book 612. In such an aspect, address book 612 may include multiple phone numbers and contextual content items 610 may be per entry in the address book. In another aspect, some contextual content items 610 may be common across multiple phone numbers stored in the address book 612. Memory 608 can additionally store protocols and/or algorithms associated with estimating and/or utilizing a channel (e.g., performance based, capacity based, etc.).

It will be appreciated that data store (e.g., memory 608) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 608 of the subject systems and methods may comprise, without being limited to, these and any other suitable types of memory.

Mobile device 600 can further include contextual content module 630 to facilitate obtaining contextually relevant content items for device 600. Contextual content module 630 may further include location module 634 to assist in determining the device 600 current location and phone number module 632 to identify a destination device of interest. In one aspect, phone number module 632 may include, a phone number, an IP address, a MAC address, a URL, email address, a short message service (SMS) data packet, an enhanced messaging service (EMS) data packet, a multimedia message service (MMS) data packet, etc., for a destination device. Contextual content module 630 may further provide destination device information and device 600 information to a contextual content server so as to subsequently receive contextually relevant content items for display on device 600. In one aspect, destination device information may be computed by a contextual content server (e.g. 130) as well.

Additionally, mobile device 600 may include user interface 640. User interface 640 may include input mechanisms 642 for generating inputs into communications device 600, and output mechanism 642 for generating information for consumption by the user of the communications device 600. For example, input mechanism 642 may include a mechanism such as a key or keyboard, a mouse, a touch-screen display, a microphone, etc. Further, for example, output mechanism 644 may include a display, an audio speaker, a haptic feedback mechanism, a Personal Area Network (PAN) transceiver etc. In the illustrated aspects, the output mechanism 644 may include a display operable to present media content that is in image or video format or an audio speaker to present media content that is in an audio format. Exemplary screen shots of a communications device connecting with a destination device and obtaining contextually relevant content items are presented and discussed in greater depth with reference to FIGS. 4 and 5.

Figure 7:
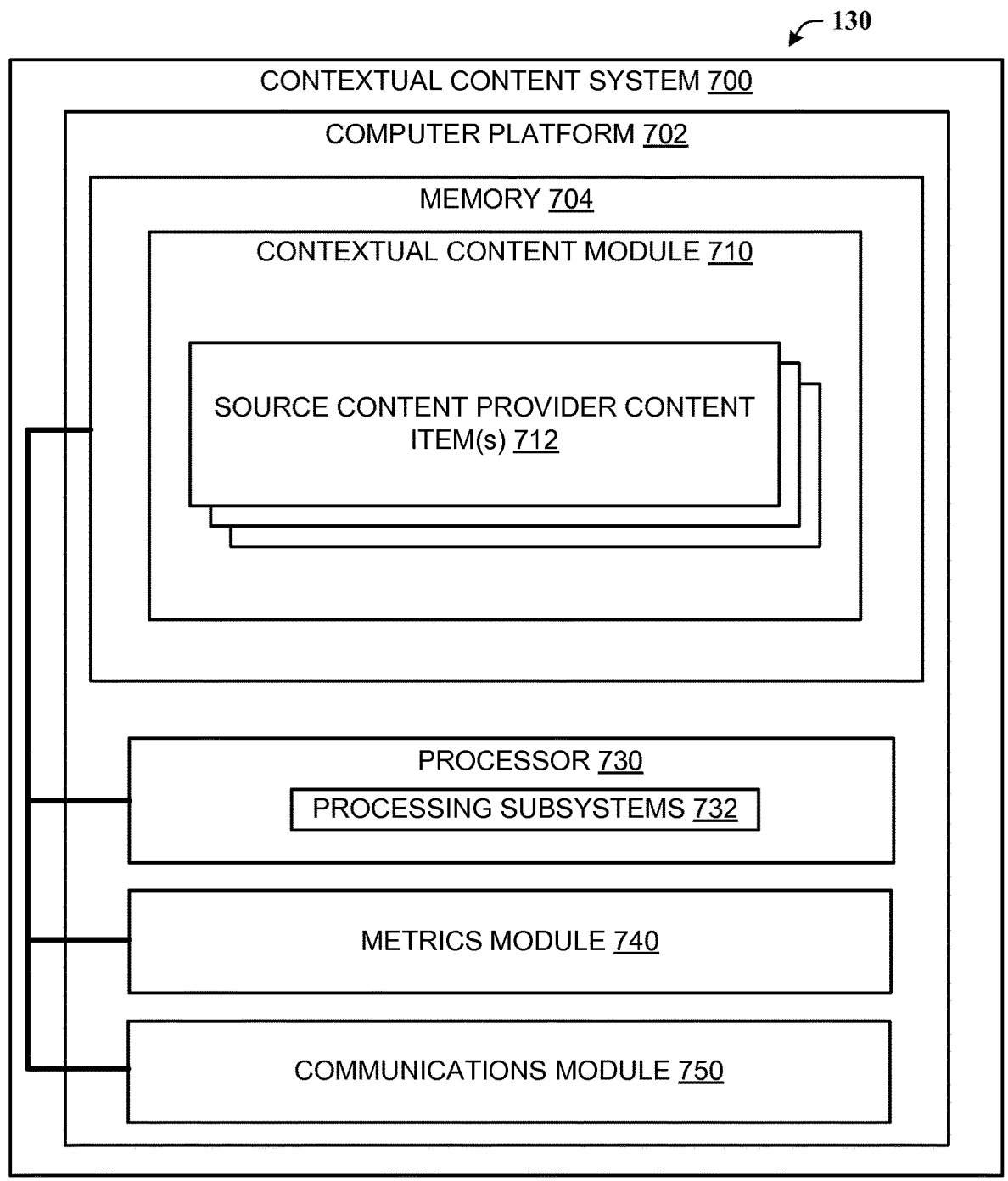
FIG. 7 illustrates exemplary block diagram of an extension system according to an aspect.

With reference to FIG. 7, illustrated is a detailed block diagram of contextual content system 700, such as contextual content server 130 depicted in FIG. 1. Contextual content system 700 may comprise at least one of any type of hardware, server, personal computer, mini computer, mainframe computer, or any computing device either special purpose or general computing device. Further, the modules and applications described herein as being operated on or executed by contextual content system 700 may be executed entirely on a single network device, as shown in FIG. 7, or alternatively, in other aspects, separate servers, databases or computer devices may work in concert to provide data in usable formats to parties, and/or to provide a separate layer of control in the data flow between communications device 110 and the modules and applications executed by contextual content system 700.

Contextual content system 700 includes computer platform 702 that can transmit and receive data across wired and wireless networks, and that can execute routines and applications. Computer platform 702 includes memory 704, which may comprise volatile and nonvolatile memory such as read-only and/or random-access memory (ROM and RAM), EPROM, EEPROM, flash cards, or any memory common to computer platforms. Further, memory 704 may include one or more flash memory cells, or may be any secondary or tertiary storage device, such as magnetic media, optical media, tape, or soft or hard disk. Further, computer platform 702 also includes processor 730, which may be an application-specific integrated circuit ("ASIC"), or other chipset, logic circuit, or other data processing device. Processor 730 may include various processing subsystems 732 embodied in hardware, firmware, software, and combinations thereof, that enable the operability of the network device on a wired or wireless network.

Computer platform 702 further includes communications module 750 embodied in hardware, firmware, software, and combinations thereof, that enables communications among the various components of contextual content system 700, as well as between contextual content system 700, devices 110, 122, and servers 140, 150, 160, 170, 180. Communication module 750 may include the requisite hardware, firmware, software and/or combinations thereof for establishing a wireless communication connection. According to described aspects, communication module 750 may include the necessary hardware, firmware and/or software for providing contextually relevant content to a wireless communications device 110.

Computer platform 702 further includes metrics module 740 embodied in hardware, firmware, software, and combinations thereof, that enable processing information received from device 110 corresponding to, among other things, information communicated from device 110. In one aspect, contextual content system 700 may analyze data received through metrics module 740 to modify relevancy determinations for providing contextually relevant content items to device 110. For example, if metrics module 740 receiving information from device 110 that a previously provided contextual content item did not perform properly, then metrics module may discontinue distribution of such an content item and may alert the content provider 140. In another example, metrics module 740 may determine, through aggregating multiple user actions, users who called a specific number also often looked at content associated with a specific product. In such an exemplary case, a contextual relevant content item related to the specific product may be provided to the user when the specific number is accessed, such as by dialing the specific number, by receiving a call from the specific number, by using an address book associated with the device to access the specific number, etc.

Memory 704 of contextual content system 700 includes a contextual content module 710 operable to provide contextually relevant content to a wireless communications device (WCD), such as device 110 from content providers, such as content server 140 and mobile operator server 150, across wireless or wired network 120. Contextual content module 710 may include source content provider content items 712. In one aspect, source content provider content items 712 may include content from multiple servers such as, mobile operator server 150, advertisement server 160, location server 170, and recommendations server 180. In one aspect, source content provider content items 712 may include: coupons, advertisements, announcements, etc., associated with products, services, individuals, groups, locations, etc. For example, contextual content module 710 may interface with an advertisements server, wherein the advertisements server enables businesses to advertise based on a phone number (e.g., a pizza company may post an ad for $5 coupon when a call is made to a competitors number). In another example, advertisers may post ads based on location to which the phone number maps (e.g., if a phone number maps to a doctor's office then pharmacies may advertise their pharmacy information to the user). In such exemplary aspects, the advertiser may be charged differently based on the area they cover (e.g., if the advertiser selects that if a call is made in a specific 6 square mile area, then they want to show their advertisement, while for a 10 square mile area the charges may be higher).

In another aspect, the contextual content module 710 may interface with a recommendations server, such as recommendations server 180. In such an aspect, the recommendations server may identifies related businesses and this information may then be used by other servers such as the advertisements server to show ads or the like, (e.g. when a user makes a call to a pizza company to order a pizza, then the recommendations server may identifies that the user may wish to watch a movie while eating said pizza, and based on this information, advertisements server may show advertisements for nearby movie rental stores).

Contextual content module 710 may provide for unicast delivery, broadcast delivery, multicast delivery or any other known or future known wireless delivery mechanism capable of delivering content such as content provider content items 712 and/or mobile operator content items 714 across a network 120. In one aspect, contextual content module 710 may determine which content item of 712, 714 may be transmitted to wireless device 110. In one aspect, metrics module 740 may provide relevancy indications to contextual content module 710 to bias selection towards certain content items 712, 714.

In operation, for example, device 110 may attempt to connect with a destination device, such as device 150. In one aspect, the destination device information, such as a phone number, and initiating device information, such as a location value, etc., may be transmitted to a contextual content system 700. Thereafter, contextual content server 700 may obtain contextually relevant content, such as described above, through processing the received information and any stored information at the contextual content system 700. At a predetermined time during the connection process, e.g. before connecting, during an active connection, or after termination of a connection, contextual relevant content items may be provided to the initiating device. As such, the initiating device may display content items relevant to the destination entity and/or similar entities.

Figure 8:
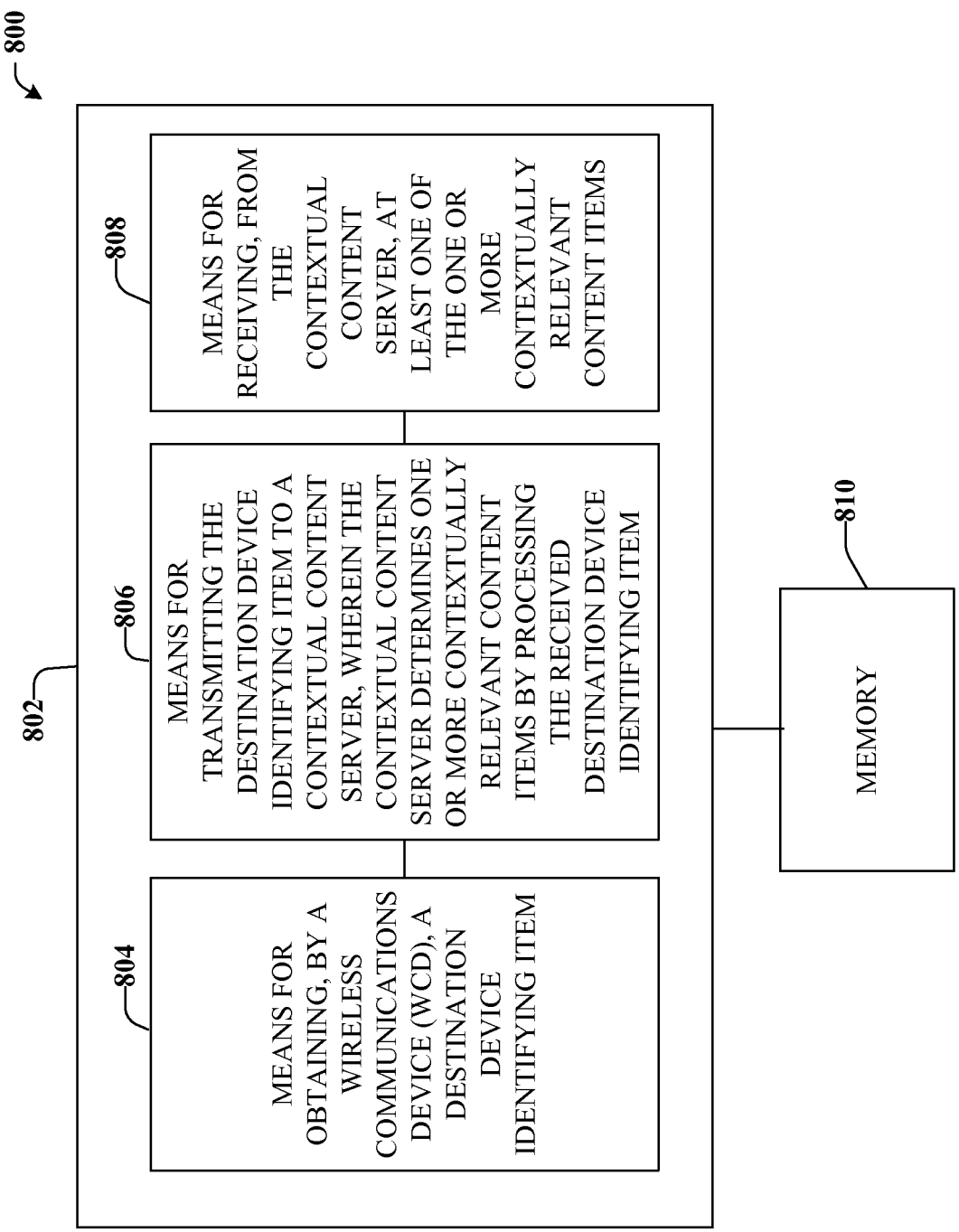
FIG. 8 illustrates a block diagram of an exemplary communications device that can obtain contextually relevant content.

With reference to FIG. 8, a block diagram of an exemplary system 800 that can obtain contextually relevant content is illustrated. For example, system 800 can reside at least partially within a wireless device. According to another example aspect, system 800 can reside at least partially within an access terminal. It is to be appreciated that system 800 is represented as including functional blocks, which can be functional blocks that represent functions implemented by a processor, software, or combination thereof (e.g., firmware). System 800 includes a logical grouping 802 of means that can act in conjunction. For instance, logical grouping 802 can include means for obtaining, by a wireless communications device (WCD), a destination device identifying item. In one aspect, the obtaining the destination device identifying item further may include: receiving a user inputted phone number from a user interface associated with the WCD, receiving a user inputted phone number from an address book associated with the WCD, receiving a user inputted value from a plurality of mobile operator provided values, receiving the destination device identifying item from the incoming call, etc. In another aspect, a WCD location value may be obtained to assist the contextual content server in determining one or more contextually relevant content items. In such an aspect, the WCD location value may be obtained through: receiving the WCD location value from a location sensor associated with the WCD, receiving the WCD location information from a user input, receiving the WCD location information from an area code of a phone number associated with the WCD, receiving the WCD location information from a location server, etc.

Further, logical grouping 802 can comprise means for transmitting the destination device identifying item to a contextual content server, wherein the contextual content server determines one or more contextually relevant content items by processing the received destination device identifying item 806. Notice that the contextual content server may receive additional information, such as a name corresponding to the destination device identifying item stored in the address book, an address corresponding to the destination device identifying item, user profile information and/or any other information present in the address book that may be relevant. In such an aspect, the contextual content server may then employ this information to provide further processed results to the mobile device. In one aspect, the contextual content server may determine relevancy of contextually relevant content items with respect: a WCD location value, a location associated with the destination device identifying item, a business or business category associated with the destination device identifying item, information obtained from an advertisement server, information obtained from a recommendations server, information obtained from a location server, or information obtained from a mobile operator associated with the WCD, etc. In such an aspect, contextually relevant content items determined with respect to the WCD location value may include: weather information, local news feeds, local events, local time, a local country specific exchange rate, a local country specific stock index trigger, one or more social networking site feed associated with a user of the WCD, one or more point of interest associated with the business category for the destination device identifying item within a predefined distance from the WCD location value, map information, map information for the at least one of the one or more points of interest, one or more recommendations for other businesses, coupons or directions to the location associated with the destination device identifying item, etc. Further, in such an aspect, contextually relevant content items determined with respect to the location associated with the destination device identifying item may include: weather information, local news feeds, a business name, a business address, a business category, one or more points of interest associated with the business category within a predefined distance, map information, map information for the at least one of the one or more points of interest associated with the business category, one or more businesses related to the business category, recommendations for the one or more businesses related to the business category, directions to at least one of the one or more businesses related to the business category, or directions from the WCD location value to the location associated with the destination device identifying item, etc. Additionally, in such an aspect, contextually relevant content items determined with respect to the mobile operator, advertisement server, location server, etc. associated with the WCD may include: one or more advertisements associated with the mobile operator, one or more advertisements from one or more content providers associated with the mobile operator, one or more advertisements associated with a business category for the destination device identifying item, one or more advertisements associated with a user profile for a user associated with the WCD, etc.

Further, logical grouping 802 can comprise means for receiving, from the contextual content server, at least one of the one or more contextually relevant content items 808. In one aspect, the receiving may include receiving during one or more operational intervals associated with the WCD, wherein the one or more operational intervals include at least one of: an interval prior to initiating a communication connection with the destination device identifying item, an interval prior to a communication connection being completed to the destination device identifying item, an interval during communications after the communication connection is established, or an interval after the communication connection is terminated. As such, a contextual content module may obtain contextually relevant content items from a server for access by a wireless device at some point during communications with another device. Additionally, system 800 can include a memory 810 that retains instructions for executing functions associated with the means 804, 806 and 808. While shown as being external to memory 810, it is to be understood that one or more of the means 804, 806 and 808 can exist within memory 810.

Figure 9:
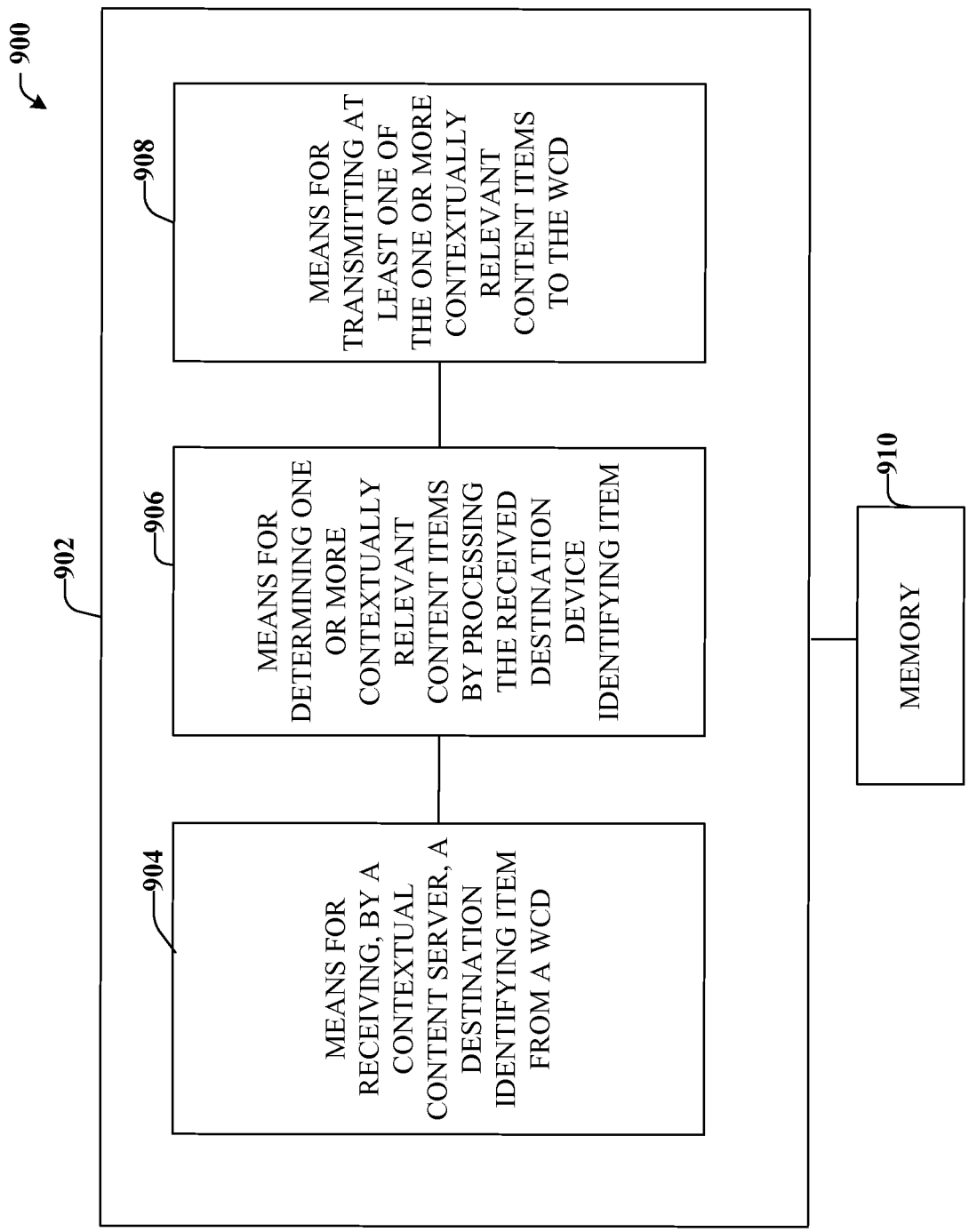
FIG. 9 illustrates a block diagram of an exemplary network device that can provide contextually relevant content to a wireless communications device.

With reference to FIG. 9, a block diagram of an exemplary system 900 that can provide contextually relevant content to a wireless communications device (WCD) is illustrated. For example, system 900 can reside at least partially within a wireless device. According to another example aspect, system 900 can reside at least partially within an access terminal. It is to be appreciated that system 900 is represented as including functional blocks, which can be functional blocks that represent functions implemented by a processor, software, or combination thereof (e.g., firmware). System 900 includes a logical grouping 902 of means that can act in conjunction. For instance, logical grouping 902 can include receiving, by a contextual content server, a destination device identifying item from a WCD 904.

Further, logical grouping 902 can comprise means for determining one or more contextually relevant content items by processing the received destination device identifying item 906 and other available information sent by the WCD such as name corresponding to the number, etc. In one aspect, the contextual content server may determine relevancy of contextually relevant content items with respect: the WCD location value, a location associated with the destination device identifying item, the business associated with the destination device identifying item, information obtained from a mobile operator associated with the WCD, information obtained from an advertisement server, recommendations server, content server with Points of Interest (POIs), location information, APIs for getting current weather and time at a particular location, APIs for news and events at a particular location, etc. In such an aspect, contextually relevant content items determined with respect to the WCD location value may include: weather information, local news feeds, at least one social networking site feed associated with a user of the WCD, one or more points of interest associated with a business category for the destination device identifying item within a predefined distance from WCD location value, map information, map information for one or more point of interest associated with the business category within a predefined distance of the WCD location value, directions to the location associated with the destination device identifying item, directions to other related businesses, etc. Further, in such an aspect, contextually relevant content items determined with respect to the location associated with the destination device identifying item may include: weather information, local news feeds, a business name associated with the destination device identifying item, a business address associated with the destination device identifying item, a business category associated with the destination device identifying item, one or more points of interest associated with the business category within a predefined distance, map information, map information for the one or more points of interest associated with the business category, directions from the WCD location value, etc. Additionally, in such an aspect, contextually relevant content items determined with respect to the mobile operator associated with the WCD may include: one or more advertisements associated with the mobile operator, one or more advertisements from one or more content providers associated with the mobile operator, one or more advertisements associated with a business category for the destination device identifying item, one or more advertisements associated with a user profile for a user associated with the WCD, one or more advertisements received from the Advertisements server, etc.

Further, logical grouping 902 can comprise means for transmitting at least one of the one or more contextually relevant content items to the WCD 908. In one aspect, the transmitting may include transmitting the contextually relevant content items during one or more operational intervals associated with the WCD, wherein the one or more operational intervals include at least one of: an interval prior to initiating a communication connection with the destination device identifying item, an interval prior to a communication connection being completed to the destination device identifying item, an interval during communications after the communication connection is established, or an interval after the communication connection is terminated. As such, a server may receive, store, analyze, and provide contextually relevant content items to a WCD at some point during communications with another device. Additionally, system 900 can include a memory 910 that retains instructions for executing functions associated with the means 904, 906 and 910. While shown as being external to memory 910, it is to be understood that one or more of the means 904, 906 and 908 can exist within memory 910.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA, WiFi, LTE, WiMax, and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 602.11 (Wi-Fi), IEEE 602.16 (WiMAX), IEEE 602.20, Flash-OFDMA, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 602.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used. It should be additionally noted, in one aspect, the user may not directly interface with the WCD that communicates with the contextual content server. A user may additionally or in the alternative interface with a separate display unit (e.g. on the wall, on car dashboard, on a PC, Personal Navigation Device (PND), etc.) that may act as the interface and the display unit for the user. In such an aspect, this device may in turn communicate with the WCD over short range wireless technologies such as but not limited to: Bluetooth, Zigbee, etc. Further, such short range wireless interface may carry contextual content between the interface device and WCD.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method of obtaining contextually relevant content by a wireless communications device (WCD), the method comprising:
   detecting, by the WCD, initiation of a connection between the WCD and a destination device over a first communication path to establish a voice call with the destination device;
   obtaining, by the WCD, a destination device identifying item based on the detected initiation of the connection and the destination device;
   transmitting, by the WCD, while establishing the voice call with the destination device, the destination device identifying item to a contextual content server over a second communication path different than the first communication path, wherein the contextual content server determines one or more contextually relevant content items by processing the received destination device identifying item while the WCD is establishing the voice call with the destination device; and
   receiving, by the WCD, from the contextual content server over the second communication path while establishing the voice call with the destination device, at least one of the one or more contextually relevant content items.

2. The method of claim 1, wherein the contextual content server determines relevancy of the one or more contextually relevant content items with respect to at least one of: a WCD location value, a location associated with the destination device identifying item, textual content parsed from the destination device identifying item, a business or business category associated with the destination device identifying item, information obtained from an advertisement server, information obtained from a recommendations server, information obtained from a location server, or information obtained from a mobile operator associated with the WCD.

3. The method of claim 2, wherein the one or more contextually relevant content items determined with respect to the WCD location value include at least one of: weather information, local news feeds, local events, local time, a local country specific exchange rate, a local country specific stock index trigger, one or more social networking site feed associated with a user of the WCD, one or more point of interest associated with the business category for the destination device identifying item within a predefined distance from the WCD location value, map information, map information for the at least one of the one or more points of interest, one or more recommendations for other businesses, coupons or directions to the location associated with the destination device identifying item.

4. The method of claim 2, wherein the one or more contextually relevant content items determined with respect to the location associated with the destination device identifying item include at least one of: weather information, local news feeds, a business name, a business address, a business category, one or more points of interest associated with the business category within a predefined distance, map information, map information for the at least one of the one or more points of interest associated with the business category, one or more businesses related to the business category, recommendations for the one or more businesses related to the business category, directions to at least one of the one or more businesses related to the business category, or directions from the WCD location value to the location associated with the destination device identifying item.

5. The method of claim 2, wherein the one or more contextually relevant content items determined with respect to the business or business category destination device identifying item includes one or more contextually relevant content items determined through extracting an alpha-numeric representation from the business destination device identifying item and using the extracted alpha-numeric representation to determine a business category or at least one related business.

6. The method of claim 2, wherein the one or more contextually relevant content items determined with respect to the advertisement server are based on at least one of: a business associated with the destination device identifying item, a location associated with the destination device identifying item, or a location relationship between the WCD location value and the location associated with the destination device identifying item.

7. The method of claim 2, wherein the one or more contextually relevant content items determined with respect to the mobile operator associated with the WCD include at least one of: one or more advertisements associated with the mobile operator, one or more advertisements from one or more content providers associated with the mobile operator, one or more advertisements associated with a business category for the destination device identifying item, or one or more advertisements associated with a user profile for a user associated with the WCD.

8. The method of claim 2, wherein the contextual content server is associated with at least one of: the mobile operator, the advertisement server, or the recommendations server.

9. The method of claim 1, wherein the obtaining the destination device identifying item further includes at least one of:
receiving a user inputted phone number from a user interface associated with the WCD,
receiving a user inputted phone number from an address book associated with the WCD,
receiving a user inputted value from a plurality of mobile operator provided values, or
receiving the destination device identifying item from the incoming call.

10. The method of claim 3, wherein the WCD location information is obtained through at least one of:
receiving the WCD location value from a location sensor associated with the WCD, or
receiving the WCD location information from a user input, or
receiving the WCD location information from an area code of a phone number associated with the WCD, or
receiving the WCD location information from a location server.

11. The method of claim 1, wherein the receiving further comprises:
receiving the at least one of the one or more contextually relevant content items during one or more operational intervals associated with the WCD, wherein the one or more operational intervals include at least one of: an interval prior to initiating a communication connection with the destination device identifying item, an interval prior to a communication connection being completed to the destination device identifying item, an interval during communications after the communication connection is established, or an interval after the communication connection is terminated.

12. The method of claim 11, wherein the receiving during the interval prior to initiating a communication connection with the destination device identifying item further comprises:
displaying the one or more contextually relevant content items in response to a user input associated with an application displaying one or more non-contextually relevant content items.

13. The method of claim 1, wherein transmitting the destination device identifying item further comprises transmitting the destination device identifying item using at least one of:
a short message service (SMS) protocol,
an enhanced messaging service (EMS) protocol,
a multimedia message service (MMS) protocol,
an Internet Protocol (IP) socket protocol,
a code division multiple access (CDMA)-based protocol, or
a global system for mobile communications (GSM)-based protocol.

14. The method of claim 1, wherein transmitting the destination device identifying item further comprises transmitting the destination device identifying item as at least one of:
a short message service (SMS) communication data packet, or
a destination device phone number.

15. A computer program product, comprising:
a non-transitory computer-readable medium comprising:
a first set of codes for causing a computer to detect, by a wireless communications device (WCD), initiation of a connection between the WCD and a destination device over a first communication path to establish a voice call with the destination device;
a second set of codes for causing the computer to obtain, by the WCD, a destination device identifying item based on the detected initiation of the connection and the destination device;
a third set of codes for causing the computer to transmit, by the WCD while establishing the voice call with the destination device, the destination device identifying item to a contextual content server over a second communication path different than the first communication path, wherein the contextual content server determines one or more contextually relevant content items by processing the received destination device identifying item while the WCD is establishing the voice call with the destination device; and
a fourth set of codes for causing the computer to receive, by the WCD, from the contextual content server over the second communication path while establishing the voice call with the destination device, at least one of the one or more contextually relevant content items.

16. A wireless communications device (WCD), comprising:
a transceiver;
a memory;
at least one processor coupled to the memory and the transceiver, wherein the at least one processor is configured for:
detecting initiation of a connection between the WCD and a destination device over a first communication path to establish a voice call with the destination device;
obtaining a destination device identifying item based on the detected initiation of the connection and the destination device;
transmitting, via the transceiver and while establishing the voice call with the destination device, the destination device identifying item to a contextual content server over a second communication path different than the first communication path, wherein the contextual content server determines one or more contextually relevant content items by processing the received destination device identifying item while the WCD is establishing the voice call with the destination device; and receiving from the contextual content server over the second communication path while establishing the voice call with the destination device, at least one of the one or more contextually relevant content items.

17. The WCD of claim 16, wherein the contextual content server determines relevancy of the one or more contextually relevant content items with respect to at least one of: a WCD location value, a location associated with the destination device identifying item, textual content parsed from the destination device identifying item, a business or business category associated with the destination device identifying item, information obtained from an advertisement server, information obtained from a recommendations server, information obtained from a location server, or information obtained from a mobile operator associated with the WCD.

18. The WCD of claim 17, wherein the one or more contextually relevant content items determined with respect to the WCD location value include at least one of: weather information, local news feeds, local events, local time, a local country specific exchange rate, a local country specific stock index trigger, one or more social networking site feed associated with a user of the WCD, one or more point of interest associated with the business category for the destination device identifying item within a predefined distance from the WCD location value, map information, map information for the at least one of the one or more points of interest, one or more recommendations for other businesses, coupons or directions to the location associated with the destination device identifying item.

19. The WCD of claim 17, wherein the one or more contextually relevant content items determined with respect to the location associated with the destination device identifying item include at least one of: weather information, local news feeds, a business name, a business address, a business category, one or more points of interest associated with the business category within a predefined distance, map information, map information for the at least one of the one or more points of interest associated with the business category, one or more businesses related to the business category, recommendations for the one or more businesses related to the business category, directions to at least one of the one or more businesses related to the business category, or directions from the WCD location value to the location associated with the destination device identifying item.

20. The WCD of claim 17, wherein the one or more contextually relevant content items determined with respect to the business or business category destination device identifying item includes one or more contextually relevant content items determined through extracting an alpha-numeric representation from the business destination device identifying item and using the extracted alpha-numeric representation to determine a business category or at least one related business.

21. The WCD of claim 17, wherein the one or more contextually relevant content items determined with respect to the advertisement server are based on at least one of: a business associated with the destination device identifying item, a location associated with the destination device identifying item, or a location relationship between the WCD location value and the location associated with the destination device identifying item.

22. The WCD of claim 17, wherein the one or more contextually relevant content items determined with respect to the mobile operator associated with the WCD include at least one of: one or more advertisements associated with the mobile operator, one or more advertisements from one or more content providers associated with the mobile operator, one or more advertisements associated with a business category for the destination device identifying item, or one or more advertisements associated with a user profile for a user associated with the WCD.

23. The WCD of claim 17, wherein the contextual content server is associated with at least one of: the mobile operator, the advertisement server, or the recommendations server.

24. The WCD of claim 16, wherein the at least one processor is further configured for:
receiving a user inputted phone number from a user interface associated with the WCD,
receiving a user inputted phone number from an address book associated with the WCD,
receiving a user inputted value from a plurality of mobile operator provided values, or
receiving the destination device identifying item from the incoming call.

25. The WCD of claim 18, wherein the at least one processor is further configured for:
receiving the WCD location value from a location sensor associated with the WCD, or
receiving the WCD location information from a user input, or
receiving the WCD location information from an area code of a phone number associated with the WCD, or
receiving the WCD location information from a location server.

26. The WCD of claim 16, wherein the at least one processor is further configured for:
receiving the at least one of the one or more contextually relevant content items during one or more operational intervals associated with the WCD, wherein the one or more operational intervals include at least one of: an interval prior to initiating a communication connection with the destination device identifying item, an interval prior to a communication connection being completed to the destination device identifying item, an interval during communications after the communication connection is established, or an interval after the communication connection is terminated.

27. The WCD of claim 26, wherein the at least one processor is further configured for:
displaying one or more non-contextually relevant content items; and
displaying the one or more contextually relevant content items in response to a user input associated with the displaying the one or more non-contextually relevant content items.

28. The WCD of claim 16, wherein the at least one processor is further configured for transmitting the destination device identifying item using at least one of:
a short message service (SMS) protocol,
an enhanced messaging service (EMS) protocol,
a multimedia message service (MMS) protocol,
an Internet Protocol (IP) socket protocol,
a code division multiple access (CDMA)-based protocol, or
a global system for mobile communications (GSM)-based protocol.

29. The WCD of claim 16, wherein the at least one processor is further configured for transmitting the destination device identifying item as at least one of:
- a short message service (SMS) communication data packet, or
- a destination device phone number.

30. A method for providing contextually relevant content to a wireless communications device (WCD), the method comprising:
- receiving over a second communication path, by a contextual content server, a destination device identifying item from the WCD, wherein the destination device identifying item is obtained by the WCD based on a detection of initiation of a connection with a destination device over a first communication path different than the second communication path and during establishing a voice call between the WCD and the destination device;
- determining, during the establishing the voice call between the WCD and the destination device, one or more contextually relevant content items by processing the received destination device identifying item; and
- transmitting, during the establishing the voice call between the WCD and the destination device, at least one of the one or more contextually relevant content items to the WCD over the second communication path.

31. The method of claim 30, wherein the determining further comprises:
- determining relevancy of at least one of the one or more contextually relevant content items with respect to at least one of: a WCD location value, a location associated with the destination device identifying item, textual content parsed from the destination device identifying item, a business or business category associated with the destination device identifying item, information obtained from an advertisement server, information obtained from a recommendations server, information obtained from a location server, or information obtained from a mobile operator associated with the WCD.

32. The method of claim 31, wherein the one or more contextually relevant content items determined with respect to the WCD location value include at least one of: weather information, local news feeds, local events, local time, a local country specific exchange rate, a local country specific stock index trigger, one or more social networking site feed associated with a user of the WCD, one or more point of interest associated with the business category for the destination device identifying item within a predefined distance from the WCD location value, map information, map information for the at least one of the one or more points of interest, one or more recommendations for other businesses, coupons or directions to the location associated with the destination device identifying item.

33. The method of claim 31, wherein the one or more contextually relevant content items determined with respect to the location associated with the destination device identifying item include at least one of: weather information, local news feeds, a business name, a business address, a business category, one or more points of interest associated with the business category within a predefined distance, map information, map information for the at least one of the one or more points of interest associated with the business category, one or more businesses related to the business category, recommendations for the one or more businesses related to the business category, directions to at least one of the one or more businesses related to the business category, or directions from the WCD location value to the location associated with the destination device identifying item.

34. The method of claim 31, wherein the one or more contextually relevant content items determined with respect to the business or business category destination device identifying item includes one or more contextually relevant content items determined through extracting an alpha-numeric representation from the business destination device identifying item and using the extracted alpha-numeric representation to determine a business category or at least one related business.

35. The method of claim 31, wherein the one or more contextually relevant content items determined with respect to the advertisement server are based on at least one of: a business associated with the destination device identifying item, a location associated with the destination device identifying item, or a location relationship between the WCD location value and the location associated with the destination device identifying item.

36. The method of claim 31, wherein the one or more contextually relevant content items determined with respect to the mobile operator associated with the WCD include at least one of: one or more advertisements associated with the mobile operator, one or more advertisements from one or more content providers associated with the mobile operator, one or more advertisements associated with a business category for the destination device identifying item, or one or more advertisements associated with a user profile for a user associated with the WCD.

37. The method of claim 31, wherein the contextual content server is associated with at least one of: the mobile operator, the advertisement server, or the recommendations server.

38. The method of claim 30, further comprising:
- establishing a communication path between the WCD and a device associated with the destination device identifying item; and
- wherein the transmitting further comprises transmitting the at least one of the one or more contextually relevant content items during one or more operational intervals associated with the WCD, wherein the one or more operational intervals include at least one of: an interval prior to initiating a communication connection with the destination device identifying item, an interval prior to a communication connection being completed to the destination device identifying item, an interval during communications after the communication connection is established, or an interval after the communication connection is terminated.

39. The method of claim 31, further comprising:
- receiving user profile information from the WCD, wherein the user profile information includes at least one of: one or more user responses to previously transmitted contextually relevant content items, one or more reports of spam from previously transmitted contextually relevant content items, or a description of attributes associated with the model of the WCD;
- storing at least a portion of the received user profile information and the destination device identifying item; and
- generating one or more refined contextually relevant content items from processing stored user profile information and destination device identifying items for a plurality of users.

40. The method of claim 39, wherein the one or more refined contextually relevant content items include at least one of: one or more advertisements based on the attributes associated with the model of the WCD, or one or more advertisements for related businesses based on recommendation from the plurality of users.

41. The method of claim 30, wherein at least one of the receiving or the transmitting further comprises receiving or transmitting the destination device identifying item using at least one of:
   a short message service (SMS) protocol,
   an enhanced messaging service (EMS) protocol,
   a multimedia message service (MMS) protocol,
   an Internet Protocol (IP) socket protocol,
   a code division multiple access (CDMA)-based protocol, or
   a global system for mobile communications (GSM)-based protocol.

42. The method of claim 30, wherein at least one of the receiving or the transmitting further comprises receiving or transmitting the destination device identifying item as at least one of:
   a short message service (SMS) communication data packet, or
   a destination device phone number.

43. A computer program product, comprising:
   a non-transitory computer-readable medium comprising:
      a first set of codes for causing a computer to receive, over a second communication path, by a contextual content server, a destination device identifying item from a wireless communications device (WCD), wherein the destination device identifying item is obtained by the WCD based on a detection of initiation of a connection with a destination device over a first communication path different than the second communication path and during establishing a voice call between the WCD and the destination device;
      a second set of codes for causing the computer to determine, during the establishing the voice call between the WCD and the destination device, one or more contextually relevant content items by processing the received destination device identifying item; and
      a third set of codes for causing the computer to transmit, during the establishing the voice call between the WCD and the destination device, at least one of the one or more contextually relevant content items to the WCD over the second communication path.

44. A contextual content server, comprising:
   a transceiver;
   a memory;
   at least one processor coupled to the memory and the transceiver, wherein the at least one processor is configured for:
      receiving over a second communication path, using the transceiver coupled to a receive antenna, a destination device identifying item from a wireless communications device (WCD), wherein the destination device identifying item is obtained by the WCD based on a detection of initiation of a connection with a destination device over a first communication path different than the second communication path and during establishing a voice call between the WCD and the destination device;
      determining, during the establishing the voice call between the WCD and the destination device, one or more contextually relevant content items by processing the received destination device identifying item; and
      transmitting, using the transceiver and during the establishing the voice call between the WCD and the destination device, at least one of the one or more contextually relevant content items to the WCD over the second communication path.

45. The contextual content server of claim 44, wherein the at least one processor is further configured for:
   determining relevancy of at least one of the one or more contextually relevant content items with respect to at least one of: a WCD location value, a location associated with the destination device identifying item, textual content parsed from the destination device identifying item, a business or business category associated with the destination device identifying item, information obtained from an advertisement server, information obtained from a recommendations server, information obtained from a location server, or information obtained from a mobile operator associated with the WCD.

46. The contextual content server of claim 45, wherein the one or more contextually relevant content items determined with respect to the WCD location value include at least one of: weather information, local news feeds, local events, local time, a local country specific exchange rate, a local country specific stock index trigger, one or more social networking site feed associated with a user of the WCD, one or more point of interest associated with the business category for the destination device identifying item within a predefined distance from the WCD location value, map information, map information for the at least one of the one or more points of interest, one or more recommendations for other businesses, coupons or directions to the location associated with the destination device identifying item.

47. The contextual content server of claim 45, wherein the one or more contextually relevant content items determined with respect to the location associated with the destination device identifying item include at least one of: weather information, local news feeds, a business name, a business address, a business category, one or more points of interest associated with the business category within a predefined distance, map information, map information for the at least one of the one or more points of interest associated with the business category, one or more businesses related to the business category, recommendations for the one or more businesses related to the business category, directions to at least one of the one or more businesses related to the business category, or directions from the WCD location value to the location associated with the destination device identifying item.

48. The contextual content server of claim 45, wherein the one or more contextually relevant content items determined with respect to the business or business category destination device identifying item includes one or more contextually relevant content items determined through extracting an alpha-numeric representation from the business destination device identifying item and using the extracted alpha-numeric representation to determine a business category or at least one related business.

49. The contextual content server of claim 45, wherein the one or more contextually relevant content items determined with respect to the advertisement server are based on at least one of: a business associated with the destination device identifying item, a location associated with the destination device identifying item, or a location relationship between the WCD location value and the location associated with the destination device identifying item.

50. The contextual content server of claim 45, wherein the one or more contextually relevant content items determined with respect to the mobile operator associated with the WCD include at least one of: one or more advertisements associated with the mobile operator, one or more advertisements from one or more content providers associated with the mobile operator, one or more advertisements associated with a business category for the destination device identifying item, or one or more advertisements associated with a user profile for a user associated with the WCD.

51. The contextual content server of claim 45, wherein the contextual content server is associated with at least one of: the mobile operator, the advertisement server, or the recommendations server.

52. The contextual content server of claim 44, wherein the at least one processor is further configured for:
   establishing a communication path between the WCD and a device associated with the destination device identifying item; and
   wherein the transmitting further comprises transmitting the at least one of the one or more contextually relevant content items during one or more operational intervals associated with the WCD, wherein the one or more operational intervals include at least one of: an interval prior to initiating a communication connection with the destination device identifying item, an interval prior to a communication connection being completed to the destination device identifying item, an interval during communications after the communication connection is established, or an interval after the communication connection is terminated.

53. The contextual content server of claim 44, wherein the at least one processor is further configured for:
   receiving user profile information from the WCD, wherein the user profile information includes at least one of: one or more user responses to previously transmitted contextually relevant content items, one or more reports of spam from previously transmitted contextually relevant content items, or a description of attributes associated with the model of the WCD;
   storing, in the memory, at least a portion of the received user profile information and the destination device identifying item; and
   generating one or more refined contextually relevant content items from processing stored user profile information and destination device identifying items for a plurality of users.

54. The contextual content server of claim 53, wherein the one or more refined contextually relevant content items include at least one of: one or more advertisements based on the attributes associated with the model of the WCD, or one or more advertisements for related businesses based on recommendation from the plurality of users.

55. The contextual content server of claim 44, wherein the at least one processor is further configured for receiving or transmitting the destination device identifying item using at least one of:
   a short message service (SMS) protocol,
   an enhanced messaging service (EMS) protocol,
   a multimedia message service (MMS) protocol,
   an Internet Protocol (IP) socket protocol,
   a code division multiple access (CDMA)-based protocol, or
   a global system for mobile communications (GSM)-based protocol.

56. The contextual content server of claim 44, wherein the at least one processor is further configured for receiving or transmitting the destination device identifying item as at least one of:
   a short message service (SMS) communication data packet, or
   a destination device phone number.

57. The method of claim 2, wherein the WCD location value corresponds to a physical location of the WCD based on global positioning system obtained data.

\* \* \* \* \*